United States Patent [19]

Hines

[11] Patent Number: 5,920,128
[45] Date of Patent: Jul. 6, 1999

[54] TRAILER ABS MONITORING AND WARNING SYSTEM

[75] Inventor: Antonio Hines, Tampa, Fla.

[73] Assignee: Grote Industries Inc., Madison, Ind.

[21] Appl. No.: 09/017,538

[22] Filed: Feb. 2, 1998

Related U.S. Application Data

[63] Continuation-in-part of application No. 08/807,665, Feb. 27, 1997, abandoned.

[51] Int. Cl.⁶ .................................................... B60D 1/62
[52] U.S. Cl. ........................ 307/10.8; 307/10.1; 307/9.1; 315/77; 340/310.01; 340/431; 364/230.2; 364/424.045
[58] Field of Search .................................. 307/9.1, 10.1, 307/10.6–10.8, 1, 2, 3; 280/DIG. 14; 340/310.08, 310.01, 310.06, 310.07, 431, 465, 468, 475; 315/77; 364/423.098, 423.099, 424.024, 424.034, 424.038, 424.04, 424.045, 230.2; 370/282

[56] References Cited

U.S. PATENT DOCUMENTS

| | | | |
|---|---|---|---|
| 4,300,126 | 11/1981 | Gajjar | 340/310.04 |
| 4,750,618 | 6/1988 | Schubert | 206/308.2 |
| 4,780,618 | 10/1988 | Wareman et al. | 307/9.1 |
| 4,857,807 | 8/1989 | Hargis | 315/77 |
| 4,897,642 | 1/1990 | DiLullo et al. | 240/925.6 |
| 4,926,158 | 5/1990 | Zeigler | 340/310 |
| 4,952,908 | 8/1990 | Sanner | 340/429 |
| 5,032,821 | 7/1991 | Domanico et al. | 340/440 |
| 5,090,779 | 2/1992 | Kramer | 303/7 |
| 5,132,664 | 7/1992 | Feldmann | 340/453 |
| 5,142,278 | 8/1992 | Moallemi et al. | 340/825.06 |
| 5,220,307 | 6/1993 | May et al. | 340/439 |
| 5,225,805 | 7/1993 | Cage et al. | 340/439 |
| 5,305,316 | 4/1994 | Yoshida et al. | 370/357 |
| 5,339,069 | 8/1994 | Penner et al. | 340/454 |
| 5,397,924 | 3/1995 | Gee et al. | 307/9.1 |
| 5,442,332 | 8/1995 | Hughes | 340/467 |
| 5,442,810 | 8/1995 | Jenquin | 455/66 |
| 5,477,207 | 12/1995 | Frame, Sr. et al. | 340/431 |
| 5,488,352 | 1/1996 | Jasper | 340/431 |
| 5,491,463 | 2/1996 | Sargeant | 340/310.01 |
| 5,521,466 | 5/1996 | Vincent | 315/77 |
| 5,581,246 | 12/1996 | Yarberry et al. | 340/825.57 |
| 5,602,482 | 2/1997 | Gutierrez | 324/504 |
| 5,644,172 | 7/1997 | Hodges | 307/10.5 |
| 5,677,667 | 10/1997 | Lesesky et al. | 340/431 |
| 5,677,671 | 10/1997 | Pabla et al. | 340/47 |

OTHER PUBLICATIONS

"Power Interval Communication Technology Over Turn Circuit", SAE International Truck & Bus Meeting & Exposition, Nov. 17–19, 1997.
Cleveland Convention Center, Cleveland, Ohio USA, 1997.
Ultra–Plex Advertisement for Grote, Mar. 30, 1997, pp. 1–4.
Ultra–Plex Advertisement for Grote, 1997, 6 pages.

*Primary Examiner*—Jeffrey Gaffin
*Assistant Examiner*—Jonathan S. Kaplan
*Attorney, Agent, or Firm*—Woodard, Emhardt, Naughton, Moriarty & McNett

[57] ABSTRACT

A communication link between a tractor and trailer is established utilizing existing by dormant tractor and trailer circuitry. In one embodiment of the invention, a tractor communications device has a communications port connected to a turn signal circuit and a trailer communications device has a communications port connected to the same turn signal circuit. The two communications devices permit communications therebetween over the turn signal circuit as long as the turn signal circuit is inactive, and otherwise inhibits such communications. In another embodiment of the invention, such a communications link is used to transmit a fault signal, relating to an abnormally operating trailer anti-lock brake system (ABS), to the tractor for activation of an in-cab ABS warning device.

23 Claims, 9 Drawing Sheets

TRAILER ABS MONITORING AND WARNING SYSTEM

CROSS REFERENCE TO RELATED U.S. PATENT APPLICATION

This application is a continuation-in-part of U.S. application Ser. No. 08/807,665, entitled COMMUNICATIONS LINK BETWEEN A TRACTOR AND TRAILER UTILIZING EXISTING TRACTOR/TRAILER CIRCUITRY, filed Feb. 27, 1997 now abandoned.

FIELD OF THE INVENTION

The present invention relates generally to systems for establishing a communications link between a tractor and trailer, and more specifically to such systems establishing such a communications link by utilizing existing tractor and trailer circuitry for the purpose of monitoring a trailer electrical system and activating a tractor warning means upon detection of abnormal operation thereof.

BACKGROUND OF THE INVENTION

For the past several decades, electrical power exchange between a tractor and trailer has been accomplished via a seven wire cable, or so-called "umbilical cord". The seven wire cable and associated seven pin connectors have become standard equipment in the tractor/trailer industry and have provided for the supply of electrical power to various trailer electrical functions such as turn signals, brake lamps, tail lamps, side marker lamps, clearance lamps and dome lamps, as well as a ground reference for the these electrical circuits. In an effort to provide uniformity throughout the industry, the society of automotive engineers (SAE) has promulgated standards for both the seven wire cable (SAE J-1067) and associated seven pin connectors (SAE J-560).

As used hereinafter, the term "tractor" refers to any vehicle having another vehicle in tow, and therefore includes medium or heavy duty trucks, tractor trucks and tractor truck/trailer combinations having a further vehicle or vehicles in tow. The term "trailer" as used hereinafter refers to tractor truck trailers, semi-trailers and the like.

Referring to FIG. 1, an example of a typical prior art electrical connection system 50 for routing electrical power to an electrical trailer system is shown. A tractor 52 includes a tractor ignition system 54 which acts as an electrical power source to provide electrical power to a tractor electrical system 56 when the tractor 52 is in operation. Connected to tractor electrical system 56 are seven electrical lines $58_1$, $58_2$, ..., $58_7$, which are configured in accordance with SAE J-1067 standards. Electrical lines $58_1$, $58_2$, ..., $58_7$ extend from tractor electrical system 56 into a connector housing 60, typically referred to as a "tractor nosebox", which is typically attached to an exterior surface of tractor 52. Housing 60 has a seven conductor electrical connector 62 associated therewith, to which electrical lines $58_1$, $58_2$, ..., $58_7$ are connected in accordance with SAE J-560 standards.

A trailer 64 includes a trailer lighting system 66 which is operable to provide the aforementioned trailer lighting functions. Connected to trailer lighting system 66 are seven electrical lines $68_1$, $68_2$, ..., $68_7$, which are configured in accordance with SAE J-1067 standards. Electrical lines $68_1$, $68_2$, ..., $68_7$ extend from trailer lighting system 66 into a connector housing 70, or "trailer nosebox", which is typically attached to an exterior surface of trailer 64. Housing 70 has a seven conductor electrical connector 72 associated therewith, to which electrical lines $58_1$, $58_2$, ..., $58_7$ are connected in accordance with SAE J-560 standards.

A seven-conductor connector/cable 74, or "umbilical cord", connects tractor electrical connector 62 to trailer electrical connector 72 so that the tractor electrical system 56 controls, and provides electrical power to, the trailer lighting system 66. A typical umbilical cord 74 includes an SAE J-1067 seven wire jacketed cable with an SAE J-560 seven conductor connector connected thereto at each end. SAE J-560 and SAE J-1067 require a white wire, which must be at least a No. 8 gauge insulated wire, to be the main ground wire, and a red wire, which must be at least a No. 10 gauge insulated wire, to be the main power wire. Black, yellow, green, brown and blue wires are also provided as general purpose wires, and must each be at least No. 12 gauge wires.

Recently, technological advances in the tractor/trailer industry have spawned the need for providing the trailer or trailers with additional electrical functions, thereby creating the concept of a "smart trailer". Examples of such functions include anti-lock brakes, electronic suspension control and tire pressure sensing, to name a few, as well as diagnostic control and fault detection of such special purpose trailer functions. Thus far, a variety of systems have been developed to provide the electrical infrastructure required to accommodate and operate these additional trailer functions, which has led to further development of new electrical interfaces operable to transmit both electrical power requirements and data communications between tractors and trailers. Examples of some recent electrical interface designs include electronic circuitry for providing data communication and electrical power routing through multiple J-560 type umbilical cord connectors, through newly developed connectors and cables having more than the standard seven conductor connections, and through the existing seven conductor (J-560/J-1067) electrical interface of FIG. 1.

Although provisions for additional connectors and connector pins may be a viable solution in the short term, this approach is generally a costly solution, particularly since the addition of further functions will require outfitting existing as well as new tractors and trailers with even more connectors and/or connector pins. This approach has the further disadvantage of reducing connector standardization and increasing connector complexity.

An example of one known design utilizing the existing J-560 electrical connector 74 of FIG. 1 to provide data communications and electrical power routing between a tractor and trailer is set forth in U.S. Pat. No. 5,397,924. The design utilizes electronic circuitry to develop a combination multiplexed high speed communication and power link between the tractor and trailer. The design incorporates circuitry for determining whether the tractor is connected, via the J-560 connector, to either a "smart" (multiplexed) trailer or a conventional (non-multiplexed) trailer. If a multiplexed trailer is connected to the tractor, two of the powered electrical wires within the seven wire J-560 connector are used for serial data communications between the tractor and trailer, and the remaining five provide power and ground connections to the trailer electrical systems. If, on the other hand, a non-multiplexed trailer is connected to the tractor, the seven wire J-560 connector is utilized in the conventional fashion, with each of the two communication wires being switched back to its corresponding conventional configuration so that the tractor electrical system controls the trailer lighting system.

Another known design utilizes a single wire communication approach along with switching circuitry operable to convert one of the multipurpose J-1067 wires to a dedicated single communications line upon detection of a "smart"

trailer connection to an appropriately outfitted tractor. The dedicated single wire approach utilizes a slower data rate than the two-wire power line communications approach and therefore typically does not suffer from electrical noise problems associated with such two-wire communications.

It is generally considered desirable by owners and operators of heavy duty tractor/trailers to maintain use of the universal J-560 connectors, sockets and associated umbilical cord in connecting a tractor to a trailer, regardless of the trailer configuration. Any other arrangement will require tractors to be outfitted with new electrical connection hardware when hauling "smart" trailers. When hauling conventional trailers, the tractor must either additionally maintain its J-560 electrical connection hardware, or each conventional trailer must be outfitted with the new conventional electrical connection hardware. In any event, requiring new electrical connection hardware on either the tractor or trailer may be too costly and/or too inefficient for heavy duty tractor/trailer owners and operators to implement.

If the universal J-560 style electrical connection hardware is to be used to provide an electrical power and/or communications interface between a tractor and trailer, it must meet several new requirements. First, the interface should include provisions for eliminating, or at least greatly reducing sources of electrical noise such as from electromagnetic interference (EMI). Second, it must be capable of providing adequate electrical power capability between the tractor and trailer while maintaining the capability of operating the trailer lighting functions. For example, the National Highway Transportation and Safety Administration (NHTSA) has recently ruled that all trailers manufactured after March of 1998 must be equipped with a trailer anti-lock brake system (ABS), and that the ABS must have a dedicated power line and a dedicated ground line provided thereto. Third, the interface should have adequate power and communications capability to permit new electrically controlled trailer functions and features to be added without requiring additional electrical connection hardware for either the tractor or trailer.

The first requirement, protection against electrical noise, may be met by the dedicated single wire communications approach, but this approach also requires one of the general purpose J-1067 wires to be dedicated strictly to communications functions.

The second requirement, provision of adequate power capability, may not be met by known prior art systems. For example, the system disclosed in U.S. Pat. No. 5,397,924 requires at least two of the seven J-560 conductors for communication purposes, and the dedicated single wire communications approach requires one of the seven J-560 conductors for such purposes. In either case, the remaining conductors may be inadequate for providing power and ground lines to all of the trailer's loads while maintaining control over the trailer's lighting circuits.

The third requirement, provision of adequate power capability for additional trailer features, likewise does not appear to be met by known prior art systems. With one or more of the seven J-560 conductors dedicated to communications in known prior art systems, and in view of the proliferation of new electrically controlled trailer functions, some requiring dedicated power and ground lines provided by the tractor, it appears unlikely that known prior art systems will be equipped to meet future power/ground line requirements.

A recent government ruling has mandated antilock brakes on all trailers effective Mar. 1, 1998. In addition, a warning system must be in place by March 2001 which requires an illumination means to be mounted in the truck cab, wherein the illumination means is activated whenever a fault condition associated with the trailer ABS exists. Several such systems are known and some such systems are described in U.S. Pat. Nos. 5,090,779 to Kramer, 5,488,352 to Jasper and 5,677,667 to Lesesky et al. However, each of these systems are problematic in that each requires provisions for a cumbersome and/or expensive communication system for transmitting the ABS fault signal to the tractor cab. For example, the Kramer reference requires a communication system operable to transmit an acoustic signal over existing air brake lines between the tractor and trailer, wherein such an acoustic signal carries the ABS fault signal. The Lesesky et al. reference, on the other hand, requires a wireless RF link to be established between tractor and trailer while the Jasper reference requires additional twisted pair communication wiring in the J-1067 cable to form an inductively coupled communication link between tractor and trailer.

What is therefore needed is a simple and inexpensive communications link for establishing communications between a tractor and trailer that utilizes, in a non-disruptive fashion, the existing J-560/J-1067 wiring. Such an arrangement should ideally be generally immune to electrical noise while providing for a maximum number of available general purpose J-1067 wires for use by the trailer lighting system and special purpose trailer electrical systems. In a specific application, such a communication system may be used to communicate ABS fault signals to a tractor warning system operable to activate a warning means in the cab area of the truck to thereby satisfy the March 2001 government mandate.

SUMMARY OF THE INVENTION

The foregoing shortcomings of the prior art are addressed by the present invention. In accordance with one aspect of the present invention, a tractor communication system for providing warning of a fault condition associated with an electrical system external to the tractor comprises an electrical connector mounted to a tractor and having a number of electrical terminals adapted for connection to an electrical system external to the tractor, a tractor electrical system including a turn signal circuit having a turn signal circuit path connected to one of the electrical terminals of the electrical connector, means disposed in a cab of the truck and responsive to a warning signal for providing a warning indicative of a fault condition associated with the electrical system external to the tractor, and a communications device having a communications port connected to the turn signal circuit path. The communications port is adapted to receive a fault signal indicative of the fault condition as long as the turn signal circuit is inactive. The communications device, in turn, provides the warning signal in response to detection of the fault signal at the communications port.

In accordance with another aspect of the present invention, a trailer communication system for providing a fault signal to a system external to the trailer comprises an electrical connector mounted to a trailer and having a number of electrical terminals adapted for connection to an electrical system external to the trailer, a trailer electrical system including a turn signal circuit having a turn signal circuit path connected to one of the electrical terminals of the electrical connector, a special purpose trailer electrical system producing an error signal in response to an abnormal operating condition thereof, and a communications device having a communications port connected to the turn signal circuit path. The communications device is responsive to detection of the error signal to transmit a corresponding fault signal at the communications port if the turn signal circuit is inactive.

In accordance with yet another aspect of the present invention, a tractor/trailer communications system for providing a warning in a tractor of a fault condition associated with a special purpose electrical system in a trailer comprises a tractor communications device associated with a tractor and having a first communications port connected to a turn signal circuit path of the tractor, a trailer communications device associated with the trailer and having a second communications port connected to a corresponding turn signal circuit path of the trailer, a special purpose electrical system associated with the trailer and producing an error signal in response to an abnormal operating condition thereof, means responsive to a warning signal for providing a warning in the tractor of a fault condition associated with the special purpose electrical system, and an electrical connection device extending between the tractor and trailer and connecting the turn signal circuit paths thereof to thereby complete a turn signal circuit. The trailer communications device is responsive to detection of the error signal at the second communications port to transmit a corresponding fault signal on the turn signal circuit if the turn signal circuit is inactive. The tractor communications device is responsive to detection of the fault signal at the first communications port to provide the warning signal.

One object of the present invention is to provide a communications system between a tractor and trailer utilizing an existing tractor/trailer turn signal circuit to provide a fault signal indicative of abnormal operation of a special purpose trailer electrical system to the tractor for activation of a warning means.

Another object of the present invention is to provide such a system wherein communications between tractor and trailer are carried out using low power communication signals incapable of activating the existing turn signal circuit.

These and other objects of the present invention will become more apparent from the following description of the preferred embodiment.

DESCRIPTION OF THE PREFERRED EMBODIMENTS

Figure 1:
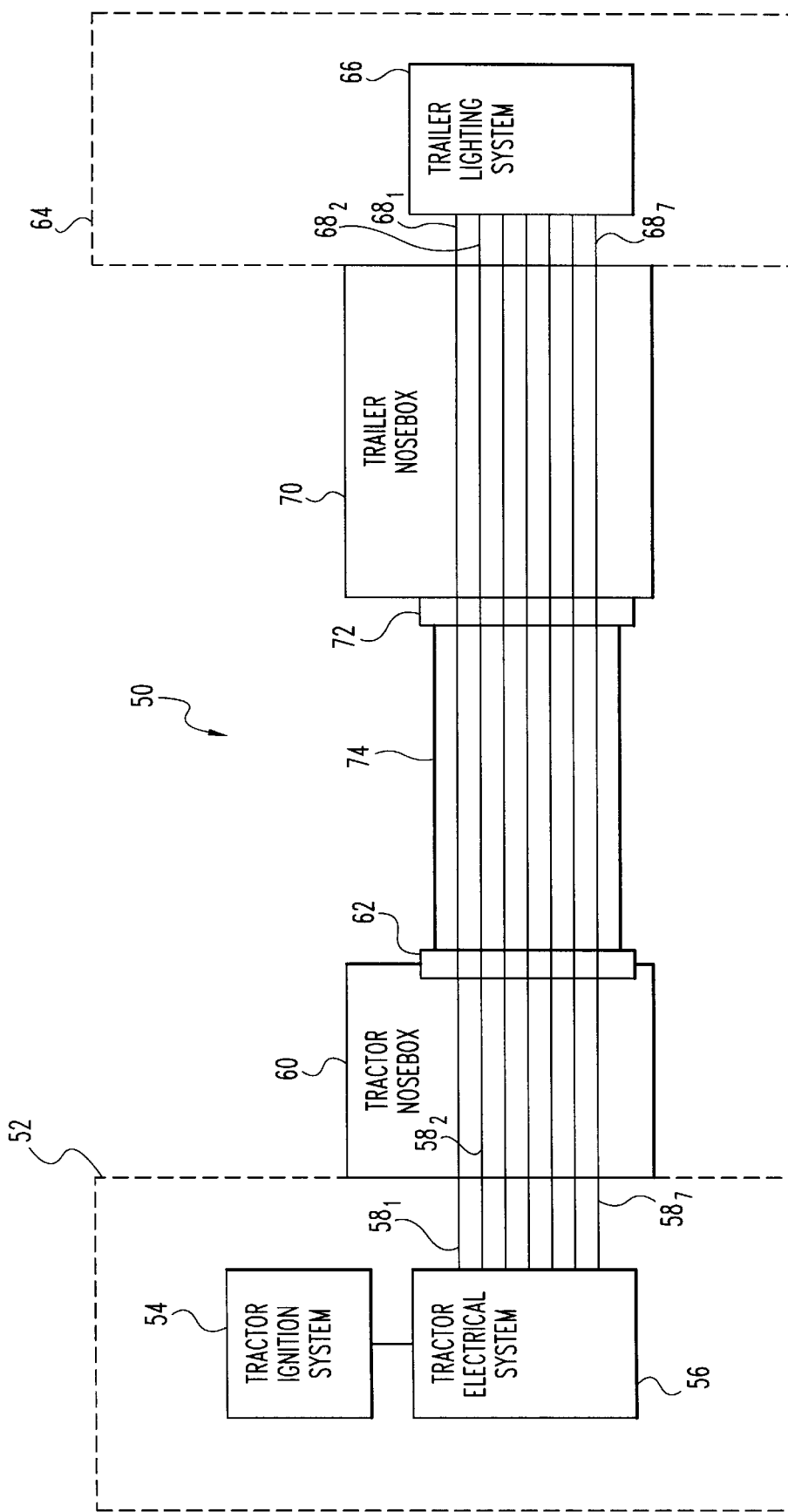
FIG. 1 is a diagrammatic illustration of a prior art electrical interface between a tractor electrical system and a trailer electrical system.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 2:
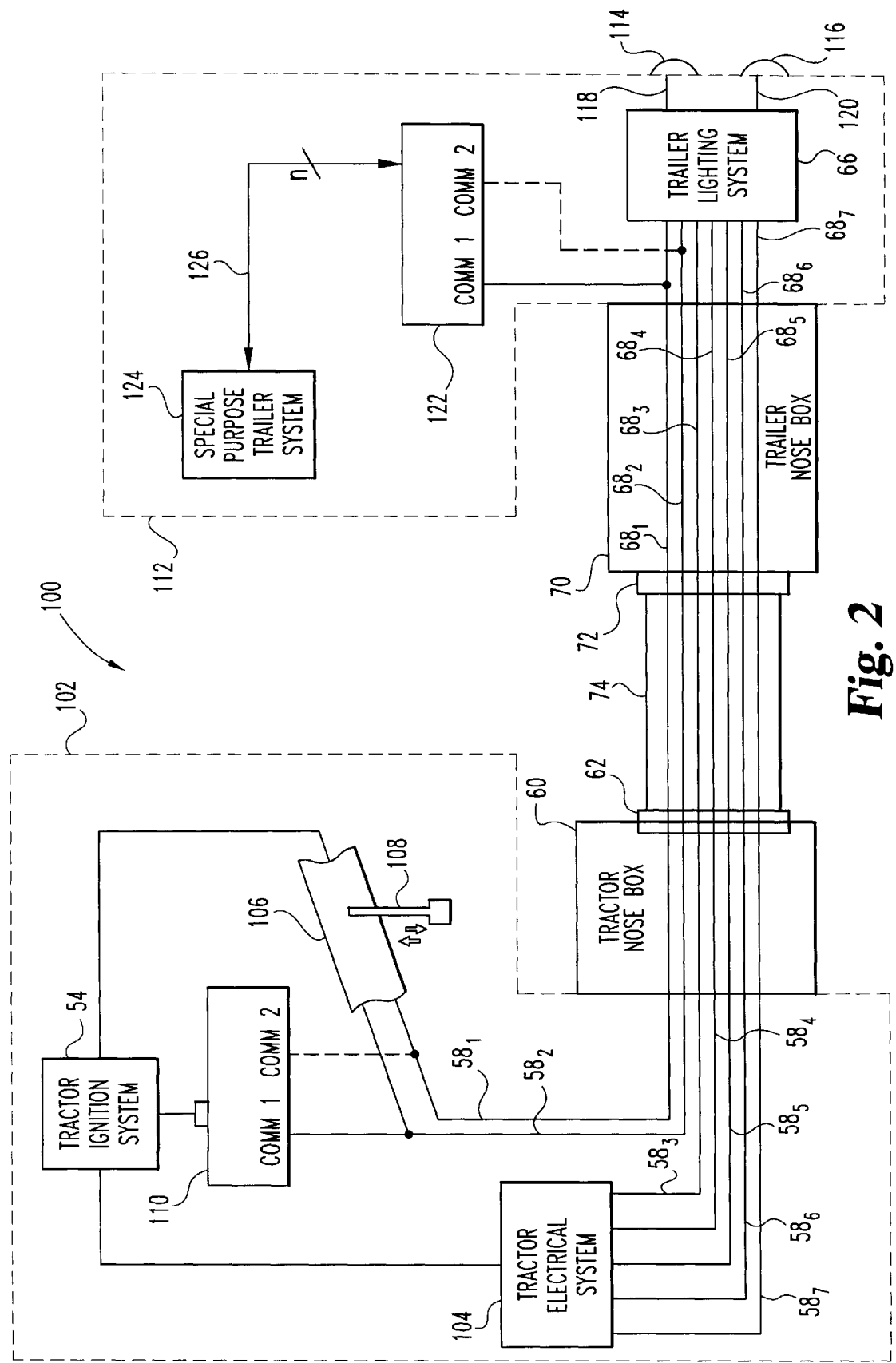
FIG. 2 is a diagrammatic illustration of a communications link between a tractor and trailer, in accordance with one aspect of the present invention, utilizing the existing electrical interface of FIG. 1.

Referring now to FIG. 2, a diagrammatic illustration of one preferred embodiment of a communications link 100 established between a tractor 102 and a trailer 112, in accordance with one aspect of the present invention, is shown. Several of the features shown in FIG. 2 are identical in structure and function to those shown and discussed with respect to FIG. 1, and like numbers will therefore be used to identify like elements.

Tractor 102 is shown in FIG. 2 as having a portion of a tractor electrical system 104 connected to the tractor ignition system 54, wherein the tractor electrical system portion 104 is intended to represent all typical tractor electrical system components with the exception of turn signal circuits. Tractor electrical system portion 104 is therefore illustrated as having electrical lines $58_3$–$58_7$ extending therefrom into electrical connector 62 positioned within tractor nosebox 60. As discussed hereinabove, electrical connector 62 is preferably a known seven conductor SAE J-560 electrical connector having seven electrical terminals formed therein, and electrical lines $58_3$–$58_7$ are each electrically connected to a separate one of the electrical terminals formed within electrical connector 62.

Tractor 102 further includes a first turn signal circuit path $58_2$ and a second turn signal circuit path $58_1$, wherein each circuit path is electrically connected at one end thereof to a separate one of the remaining two electrical terminals formed within electrical connector 62. The opposite ends of the two turn signal circuit paths $58_1$ and $58_2$ are electrically connected to a means for periodically activating either of the two turn signal circuits. Preferably, the means for periodically activating either of the two turn signal circuits includes a steering column 106 having a turn signal activation lever 108 extending therefrom, wherein the turn signal circuits are powered by tractor ignition system 54. As is known in the art, turn signal activation lever 108 is actuated in one direction, typically upwardly as indicated by the upward vertical arrow, to select the right turn signal circuit for operation, and is actuated in an opposite direction, typically downwardly as indicated by the downward vertical arrow, to select the left turn signal circuit for operation. Each circuit typically further includes known electrical componentry that is operable to periodically activate the selected turn signal circuit, and to de-select the selected turn signal circuit operation when the vehicle has completed the turn. It is to be understood, however, that the present invention contemplates utilizing other known means for periodically activating either of the two turn signal circuits.

Tractor 102 further includes a communications device 110 defining a first communications port COMM1 and a second optional communications port COMM2. Communications port COMM1 is electrically connected to either turn signal circuit path, such as turn signal circuit path $58_2$ as shown in FIG. 2, wherein turn signal circuit path $58_2$ may be connected to either of the left or right turn signal circuits. Communications port COMM2 is electrically connected to the remaining turn signal circuit, such as circuit path $58_1$ as shown by the dashed line in FIG. 2. Communications device 110 is preferably a microprocessor-based control computer having memory including at least RAM and ROM, digital and analog I/O and preferably a DUART as is known in the art.

Trailer 112 includes trailer lighting system 66 which is operable to provide the trailer lighting functions discussed in the BACKGROUND section. Connected to trailer lighting system 66 are seven electrical lines $68_1, 68_2, \ldots, 68_7$, which are configured in accordance with SAE J-1067 standards. Electrical lines $68_1, 68_2, \ldots, 68_7$ extend into electrical connector 72 positioned within trailer nosebox 70. As with electrical connector 62, electrical connector 72 is preferably a known seven conductor SAE J-560 electrical connector having seven electrical terminals formed therein, and electrical lines $68_1$–$68_7$ are each electrically connected to a separate one of the electrical terminals formed within electrical connector 72.

Trailer lighting system 66 is further connected to a first turn signaling lamp 114 via signal path 118, and a second turn signaling lamp 116 via signal path 120. Trailer lighting system 66 is operable, as is known in the art, to periodically illuminate the appropriate turn signaling lamp 114 or 116 in accordance with the corresponding turn signal circuit selected from within the tractor 102.

Trailer 112 further includes a communications device 122 defining a first communications port COMM1 and a second optional communications port COMM2. Communications port COMM1 of communications device 122 is electrically connected to the same turn signal circuit path as communications port COMM1 of communications device 110. As illustrated in FIG. 2, communications port COMM1 of communications device 122 is thus electrically connected to electrical line $68_2$. Optional communications port COMM2 of communications device 122 is likewise connected to the same turn signal circuit path as communications port COMM2 of communications device 110, and is therefore connected to electrical line $68_1$ as illustrated by the dashed line in FIG. 2. As with communications device 110, communications device 122 is preferably a microprocessor-based control computer having memory including at least RAM and ROM, digital and analog I/O and preferably a DUART as is known in the art. Trailer 112 may further include a special purpose trailer electrical system 124 which is connected to communication device 122 via n signal paths, wherein n may be an integer. When communication between communications device 122 and communications device 110 is permitted, as will be discussed in greater detail hereinafter, communications device 122 provides information relating to special purpose trailer electrical system 124 over the established communication path. One example of such information includes diagnostic data relating to the operation of the special purpose trailer electrical system 124.

In operation, both the tractor communications device 110 and the trailer communications device 122 are operable, in accordance with one embodiment of the present invention, to continually monitor their respective COMM1 port and permit communications therebetween over the turn signal circuit path comprising electrical lines $58_2$ and $68_2$ as long as the corresponding turn signal circuit is inactive. Thus, as long as the turn signal circuit corresponding to turn signal circuit path $58_2/68_2$ is not electrically energized, tractor communications device 110 and trailer communications device 122 may send and receive information therebetween via the COMM1 communications ports. If the turn signal circuit corresponding to turn signal circuit path $58_2/68_2$ is electrically energized, both the tractor communications device 110 and the trailer communications device 122 are operable to inhibit such communications until the turn signal circuit is subsequently de-energized.

In managing such communications, both the tractor communications device 110 and the trailer communications device 122 are operable to continually monitor their respective COMM1 ports to determine whether the turn signal circuit corresponding to turn signal circuit path $58_2/68_2$ is active. In one embodiment of the present invention, the tractor communications device 110 and the trailer communications device 122 continually monitor the electrical noise level present at their respective COMM1 ports. If the electrical noise level is above a predefined noise threshold level, the corresponding turn signal circuit is considered to be active and communications between devices 110 and 122 is inhibited. If, on the other hand, the electrical noise level detected at each of the COMM1 ports is below the predefined noise threshold level, the corresponding turn signal circuit is considered to be inactive and communications between devices 110 and 122 is permitted.

In an alternate embodiment of the present invention, the tractor communications device 110 and the trailer communications device 122 continually monitor the voltage level present at their respective COMM1 ports. If the voltage level at the COMM1 ports is above a predefined voltage threshold level, the corresponding turn signal circuit is considered to be active and communications between devices 110 and 122 is inhibited. If, on the other hand, the voltage level present at the COMM1 ports is below the predefined voltage threshold level, the corresponding turn signal circuit is considered to be inactive and communications between devices 110 and 122 is permitted. In this embodiment, it is intended that an active state of the turn signal circuit corresponds to the tractor battery voltage (approximately 12 volts), and that communications between the COMM1 ports of devices 110 and 122 is carried out using digital signals of between approximately 0–5.0 volts. Thus, the predefined voltage threshold level is preferably set somewhere between 5.0–12.0 volts (or other battery voltage level). It is to be understood, however, that the present invention contemplates using other voltage levels and ranges to define both the active state of the turn signal circuit and the communication voltage levels, the importance to this embodiment of the present invention being that the predefined voltage level be appropriately set to permit a distinction to be made between turn signal active state voltages and communication voltages.

In another alternate embodiment of the present invention, the tractor communications device 110 and the trailer communications device 122 continually monitor the electrical current level flowing through the turn signal circuit corresponding to the turn signal circuit path $58_2/68_2$, in accordance with known techniques. If this current level is above a predefined current threshold level, the corresponding turn signal circuit is considered to be active and communications between devices 110 and 122 is inhibited. If, on the other hand, this current level is below the predefined voltage threshold level, the corresponding turn signal circuit is considered to be inactive and communications between devices 110 and 122 is permitted.

In still another alternate embodiment of the present invention, the tractor communications device 110 and the trailer communications device 122 continually monitor the duration of the signals present at their respective COMM1 ports. If the signal duration present at the two COMM1 ports is greater than a predefined duration, the signal is considered to be a turn signal circuit activation signal, the corresponding turn signal circuit is thus considered to be active, and communications between devices 110 and 122 is therefore inhibited. If, on the other hand, the signal duration present at the two COMM1 ports is less than or equal to the predefined duration, the signal is considered to be a communications signal, the corresponding turn signal circuit is considered to be inactive, and further communications between devices 110 and 122 is permitted.

Figure 3:
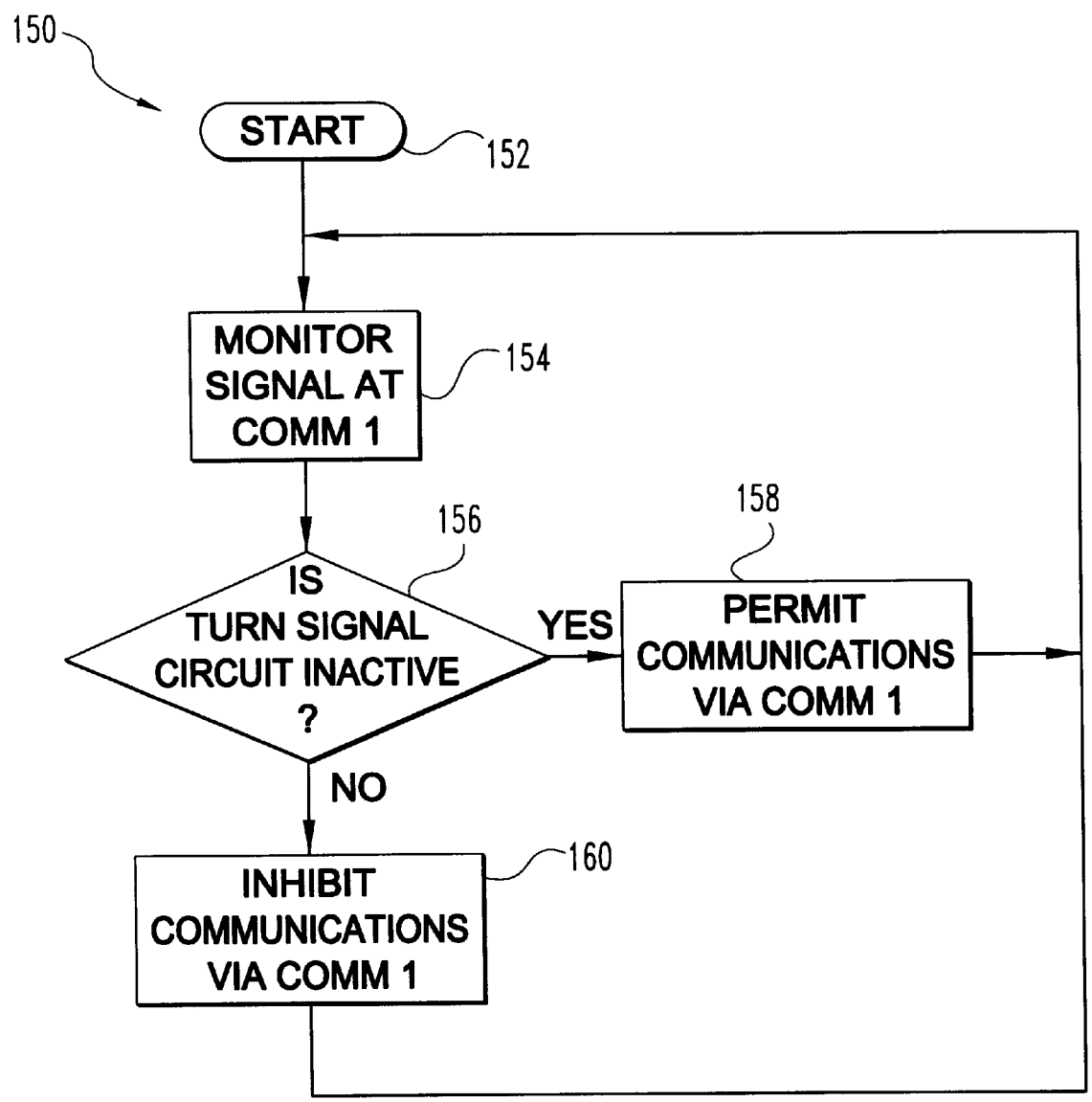
FIG. 3 is a flowchart illustrating one embodiment of a software algorithm for managing a communications link between a tractor and a trailer, in accordance with another aspect of the present invention.

Referring now to FIG. 3, a flowchart is shown illustrating one embodiment of a software algorithm 150 for managing communications between tractor communications device 110 and trailer communications device 122 as just described. Preferably, algorithm 150 is resident within memory of each device 110 and 122 and is executed by each of the devices 110 and 122 many times per second to thereby permit devices 110 and 122 to continually manage communications therebetween. The algorithm 150 begins at step 152 and at step 154, both the tractor communications device 110 and the trailer communications device 122 monitor their respective COMM1 port. Thereafter at step 156, each device 110 and 122 tests whether the turn signal circuit connected to its respective COMM1 port is inactive according to any of the techniques described hereinabove. If inactive (dormant), algorithm execution continues at step 158 where each device 110 and 122 permits communications between the two COMM1 ports over the corresponding turn signal circuit. If, on the other hand, each device 110 and 122 determines at step 156 that the turn signal circuit connected to its respective COMM1 port is active, meaning that electrical power is currently being supplied to the turn signal circuit, algorithm execution continues at step 160 wherein each device 110 and 122 inhibits communications between the two COMM1 ports over the corresponding activated turn signal circuit. Algorithm execution continues from either step 158 or step 160 back to step 154 to restart the monitoring process.

In accordance with the foregoing embodiment of the present invention, communications between tractor communications device 110 and trailer communications device 122 is permitted only when the turn signal circuit connected to the two COMM1 ports is dormant (inactive). For some special purpose trailer electrical systems 124, "real time" communications between devices 110 and 122 is not required and the communications scheme just discussed provides adequate communications capability. However, other special purpose trailer electrical systems 124 do require "real time" communications between devices 110 and 122, and the present invention addresses such a need by providing an alternate communications path between devices 110 and 122 when the turn signal circuit connected to the COMM1 ports is active.

In accordance with an alternate embodiment of the present invention, the present invention takes advantage of the fact that, during normal operation of a tractor/trailer combination, activation of the "left turn" signal circuit is mutually exclusive of activation of the "right turn" signal circuit. As shown in FIG. 2, both the tractor communications device 110 and trailer communications device 122 are optionally equipped with an additional communications port COMM2 which is connected to the turn signal circuit corresponding to the turn signal circuit path comprising electrical lines $58_1/68_1$. If devices 110 and 122 determine that the turn signal circuit connected to the two COMM1 ports is currently active and communications between devices 110 and 122 via the two COMM1 ports is therefore inhibited, such communications is routed to the inactive turn signal circuit and communications between devices 110 and 122 is carried out between the two COMM2 ports according to the various techniques described hereinabove with respect to communications via the COMM1 ports.

Figure 4:
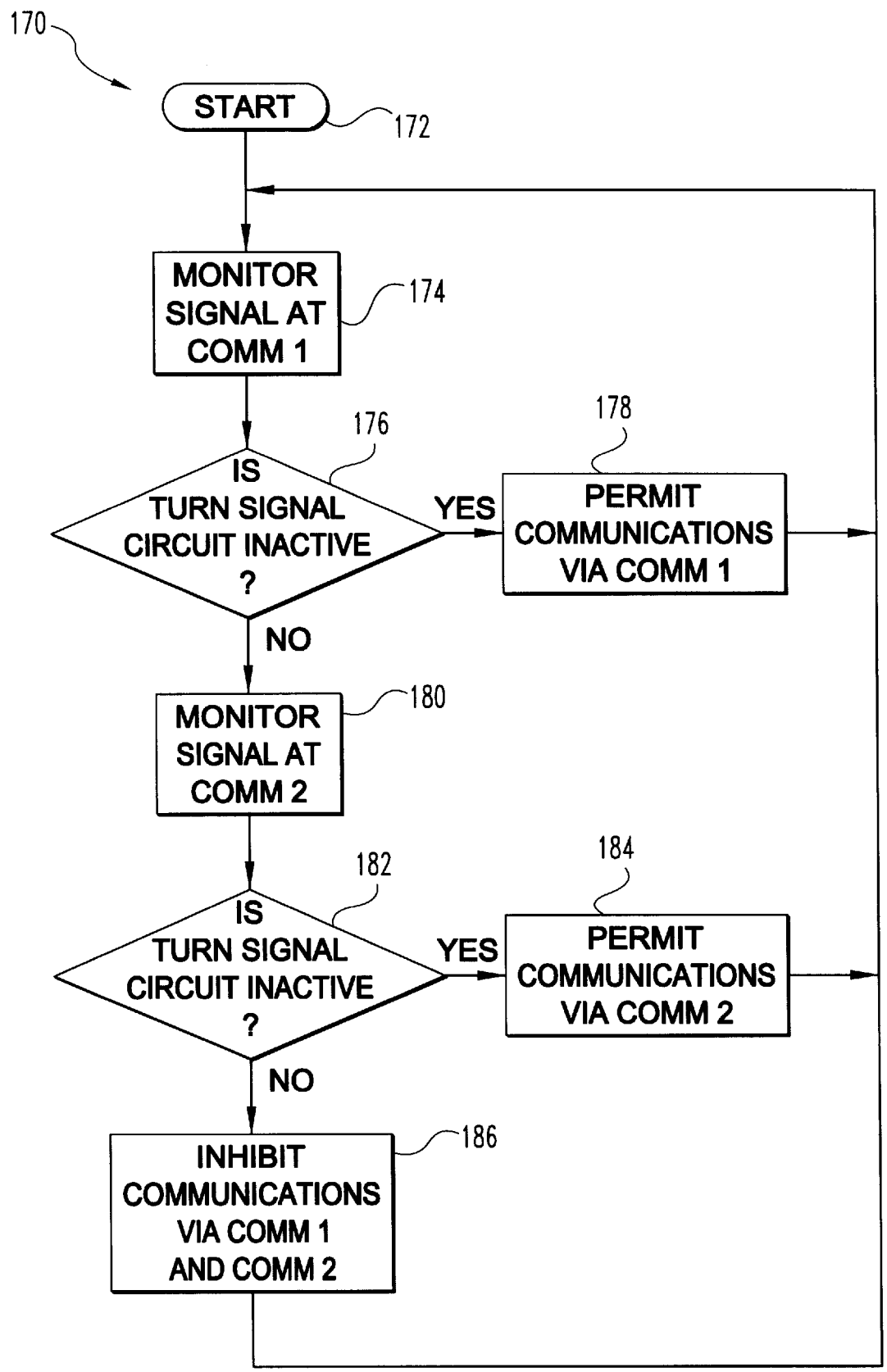
FIG. 4 is a flowchart illustrating an alternate embodiment of a software algorithm for managing a communications link between a tractor and a trailer, in accordance with the present invention.

Referring now to FIG. 4, a flowchart is shown illustrating one embodiment of an alternate software algorithm 170 for managing communications between tractor communications device 110 and trailer communications device 122 via either the COMM1 ports or the COMM2 ports as just described. As with algorithm 150, algorithm 170 is preferably resident within memory of each device 110 and 122 and is executed by each of the devices 110 and 122 many times per second to thereby permit devices 110 and 122 to continually manage communications therebetween. The algorithm 170 begins at step 172 and at step 174, both the tractor communications device 110 and the trailer communications device 122 monitor their respective COMM1 port. Thereafter at step 176, each device 110 and 122 tests whether the turn signal circuit connected to its respective COMM1 port is inactive according to any of the techniques described hereinabove. If inactive, algorithm execution continues at step 178 where each device 110 and 122 permits communications between the two COMM1 ports over the corresponding dormant turn signal circuit. If, on the other hand, each device 110 and 122 determines at step 176 that the turn signal circuit connected to its respective COMM1 port is active, meaning that electrical power is currently being supplied to the turn signal circuit connected to the two COMM1 ports, algorithm execution continues at step 180 wherein both the tractor communications device 110 and trailer communications device 122 monitor their respective COMM2 port. Thereafter at step 182, each device 110 and 122 tests whether the turn signal circuit connected to its respective COMM2 port is inactive according to any of the techniques described hereinabove. If inactive, algorithm execution continues at step 184 where each device 110 and 122 permits communications between the two COMM2 ports over the corresponding dormant turn signal circuit. If, on the other hand, each device 110 and 122 determines at step 182 that the turn signal circuit connected to its respective COMM2 port is active, meaning that electrical power is currently being supplied to the turn signal circuit connected to the two COMM2 ports, algorithm execution continues at step 186 wherein each device 110 and 122 inhibits communications between the two COMM2 ports over the corresponding activated turn signal circuit. Algorithm execution continues from any of steps 178, 184 or 186 back to step 174 to restart the monitoring process.

In the execution of algorithm 170, it is to be understood that steps 180, 182 and 186 may be omitted such that the "No" branch of step 176 connects directly to step 184. Under normal operation of the tractor/trailer combination, as discussed hereinabove, operation of the two turn signal circuits is mutually exclusive and algorithm 170 therefore need not monitor the turn signal circuit connected to the two COMM2 ports for activity thereon. However, steps 180, 182 and 186 of algorithm 170 further take into account that under emergency conditions an emergency lamp flashing circuit of the tractor (not shown) may be activated wherein both turn signal circuits are simultaneously periodically activated. Under such conditions, steps 180, 182 and 186 of algorithm 170 may be included to ensure that communications between devices 110 and 122 are inhibited via either the COMM1 or COMM2 ports, although it is generally understood that under such conditions, the tractor/trailer combination is either stopped or operating under less than normal capacity conditions.

Figure 5:
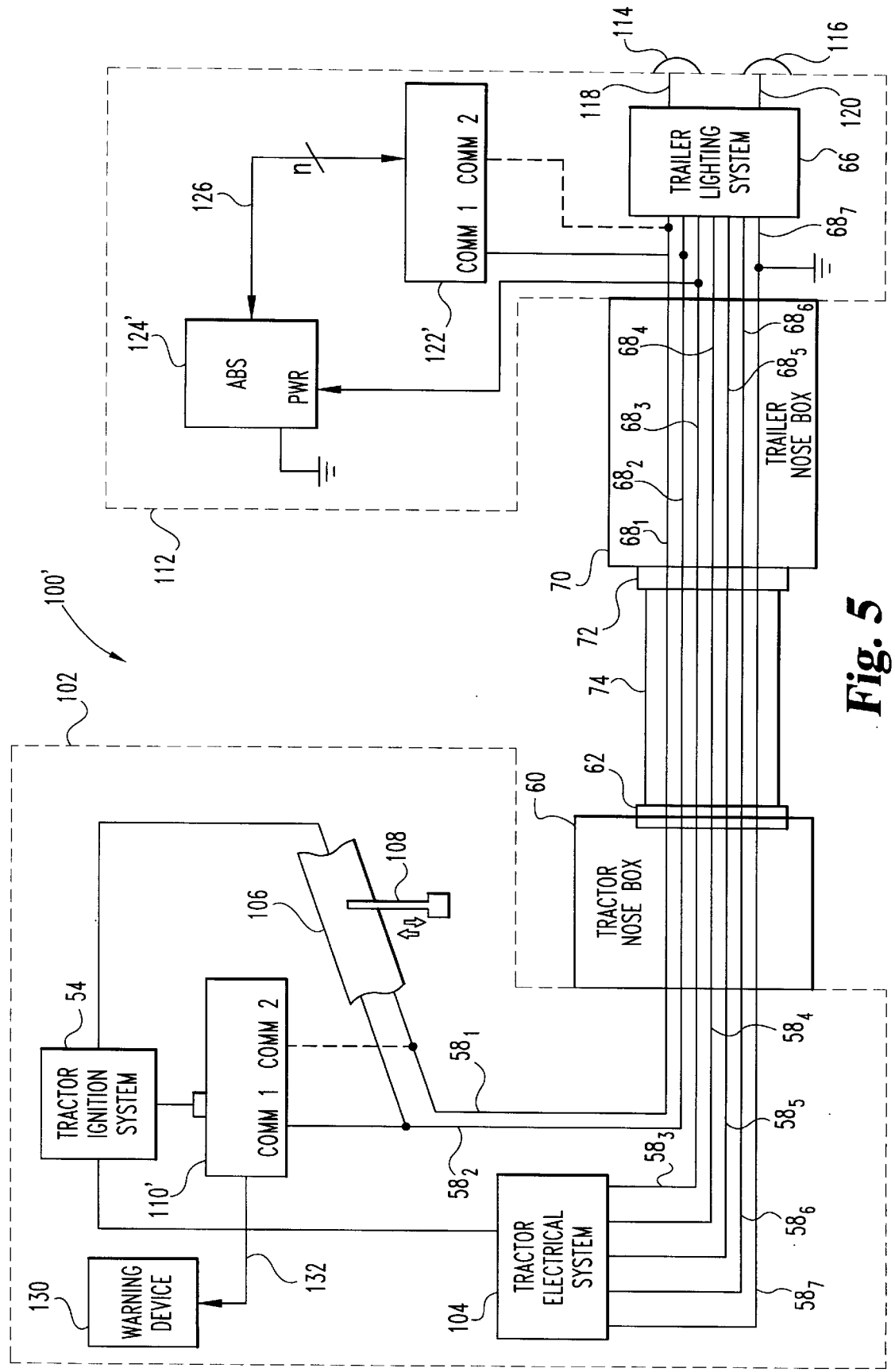
FIG. 5 is a diagrammatic illustration of one embodiment of an ABS fault warning system utilizing the communications link of FIG. 2, in accordance with another aspect of the present invention.

Referring now to FIG. 5, one preferred embodiment of a trailer ABS fault warning system 100' utilizing the communications link of FIG. 2, in accordance with another aspect of the present invention, is shown. Many of the components of FIG. 5 are identical in structure and function to like numbered components illustrated in FIG. 2 and fully described hereinabove. Differences between system 100 of FIG. 2 and system 100' of FIG. 5 include preferred configurations of tractor communications device 110' and trailer communications device 122', anti-lock brake system (ABS) device 124' forming the special purpose trailer system 124 having an electrical power input connected to a dedicated electrical power line $68_3$ of trailer 112 and a ground connection thereto, and the addition of warning device 132 disposed in the cab area of the tractor 102 and electrically connected to tractor communications device 110' via signal path 132. Alternatively, the ABS ground input may be connected via a separate electrical conductor to a ground line $68_7$ of trailer 112.

ABS device 124' may be any trailer ABS unit known to those skilled in the art and operable to inhibit trailer wheel lockup when applying the trailer brakes. ABS device 124' preferably includes a diagnostics portion operable to detect abnormal operation of the ABS and produce an ABS error signal on signal path 126, where n=1 in the system 100' illustrated in FIG. 5, whenever such abnormal operation occurs as is known in the art. In the embodiment illustrated in FIG. 5, trailer communications device 122' is preferably configured strictly as a transmitter of ABS fault information via communications port COMM1 thereof, although the present invention contemplates configuring trailer communications device 122' as a transceiver (transmitter and receiver) so that information relating to other special purpose trailer electrical systems may be received via turn signal line $68_2$. It should also be understood that while trailer communications device 122' is shown in FIG. 5, and will be described hereinafter, as including only a single communications port COMM1 connected to turn signal path $68_2$, the present invention contemplates providing for a second communications port COMM2 connected to turn signal path $68_1$ as indicated by the dashed line in FIG. 5 for communicating information to/from tractor communications device 110' via the alternate turn signal path as described hereinabove.

Likewise, in the embodiment illustrated in FIG. 5, tractor communications device 110' is preferably configured strictly as a receiver of ABS fault information via communications port COMM1 thereof, although the present invention contemplates configuring tractor communications device 110' as a transceiver (transmitter and receiver) so that information relating to other special purpose trailer electrical systems may be transmitted via turn signal line $68_2$. It should also be understood that while tractor communications device 110' is shown in FIG. 5, and will be described hereinafter, as including only a single communications port COMM1 connected to turn signal path $68_2$, the present invention contemplates providing for a second communications port COMM2 connected to turn signal path $68_1$, as indicated by the dashed line in FIG. 5 for communicating information to/from trailer communications device 110' via the alternate turn signal path as described hereinabove.

Tractor communications device 110' also includes a warning signal output connected to warning device 130 via signal path 132. Preferably, warning device 130 is an illumination device such as a lamp, LED, array or matrix of LEDs, LED or laser driven fiber optic system or the like, that illuminates in response to the warning signal provided on signal path 132 to thereby provide a visual indication in the tractor cab of fault condition associated with ABS 124'. Alternatively, the present invention contemplates providing warning device as a display unit forming part of a CRT, liquid crystal or similar monitor, or as a known audible alarm. In any case, warning device 130 is responsive to the warning signal provided on signal path 132 to produce a warning indicative of a fault condition associated with ABS 124', wherein such a warning is noticeable by a driver of the tractor 102.

In the operation of system 100, trailer communications device 122' is operable to monitor ABS 124' by monitoring signal line 126 for an error signal corresponding to an ABS fault condition. If such an error signal is detected on signal path 126, trailer communications device 122' is operable to determine the status of turn signal circuit path $68_2$, preferably by sensing the signal strength on turn signal circuit path $68_2$ via communications port COMM1 thereof. If the turn signal circuit is inactive, indicated either by sufficiently low signal strength or by the absence of a signal on signal path $68_2$, trailer communications device 122' is operable to transmit a corresponding fault signal on turn signal circuit path $68_2$ via communications port COMM1. If, on the other hand, trailer communications device 122' determines that the turn signal circuit is active, indicated by a sufficiently strong signal, noise or other data signal on circuit path $68_2$, trailer communications device 122' is operable to delay transmission of the ABS fault signal thereon until such time that device 122' determines that the turn signal circuit is inactive as described above. It has been determined through experimentation that, as typical turn signal circuits are periodic in their operation, there exists sufficient time between turn signal circuit activation periods (when the turn signal circuit is inactive) to transmit a detectable ABS fault signal to tractor communications device 110'. If the turn signal circuit becomes active before the entire ABS fault signal can be transmitted, trailer communications device 122' is preferably operable to wait until turn signal circuit again becomes inactive. This operation allows the ABS fault signal to be successfully transmitted on a single turn signal circuit path even when the turn signal circuit is periodically active such as during normal operation of the turn signal circuit. In one preferred embodiment, trailer communications device 122' will successfully transmit the ABS fault signal with turn signal flash rates of up to 240 flashes per minute, thereby exceeding by a factor of two the maximum turn signal flash rate allowed by present laws. Alternatively, as described hereinabove, trailer communications device 122' may be configured with a second communications port COMM2 to transmit the ABS fault signal on turn signal circuit path $68_1$, when the turn signal circuit path $68_2$ is active. In any case, trailer communications module 122' preferably transmits the ABS fault signal periodically as long as the ABS error signal is present on signal path 126.

Tractor communications device 110' is operable to monitor the turn signal circuit path $58_2$ via COMM1 thereof for an ABS fault signal transmitted by trailer communications device 122'. Preferably, tractor communications device 110' includes filtering and signal detection circuitry operable to filter noise from the incoming signal and to discriminate between an ABS fault signal and a turn signal circuit activation signal. Upon detection of an ABS fault signal, tractor communications device 110' is operable to produce a warning signal on signal path 132 to activate warning device 130. Preferably, the tractor communications device 110' is operable to maintain production of the warning signal on signal path 132 for a only a predetermined time period after receiving a fault signal at communications port COMM1 thereof. In one preferred embodiment, tractor communications device 110' must receive a proper ABS fault signal at least once every six seconds in order to maintain production of the warning signal on signal path 132. If no ABS fault signal is received at COMM1 within six seconds of receiving the last ABS fault signal, tractor communications device 110' inhibits the warning signal and thereby deactivates the warning device 130. Those skilled in the art will recognize that predetermined time periods other than six seconds may be used in practicing the concepts of the present invention, depending upon design choice.

The ABS fault signal format utilized by system 100' is preferably a serial data protocol comprising two idle bits for charging, sequentially followed by a start bit eight data bits (including three address bits), one parity bit and a stop bit. However, it is to be understood that the present invention also contemplates utilizing other serial data protocols such as the SAE-J1587 protocol wherein 21 data bits are used between the start bit and the parity bit. In any case, the ABS fault signal, or any other data signal transmitted by trailer control device 122', is preferably transmitted at 9,600 baud and is sent out six times every 1.5 seconds. Other data transmission rates are contemplated. In any event, preferably two such ABS fault signals must match consecutively without any parity error in order to complete a successful data transmission and reception, although the present invention contemplates requiring redundancy of any number of fault signals without parity error for successful data transmission and reception.

Figure 6:
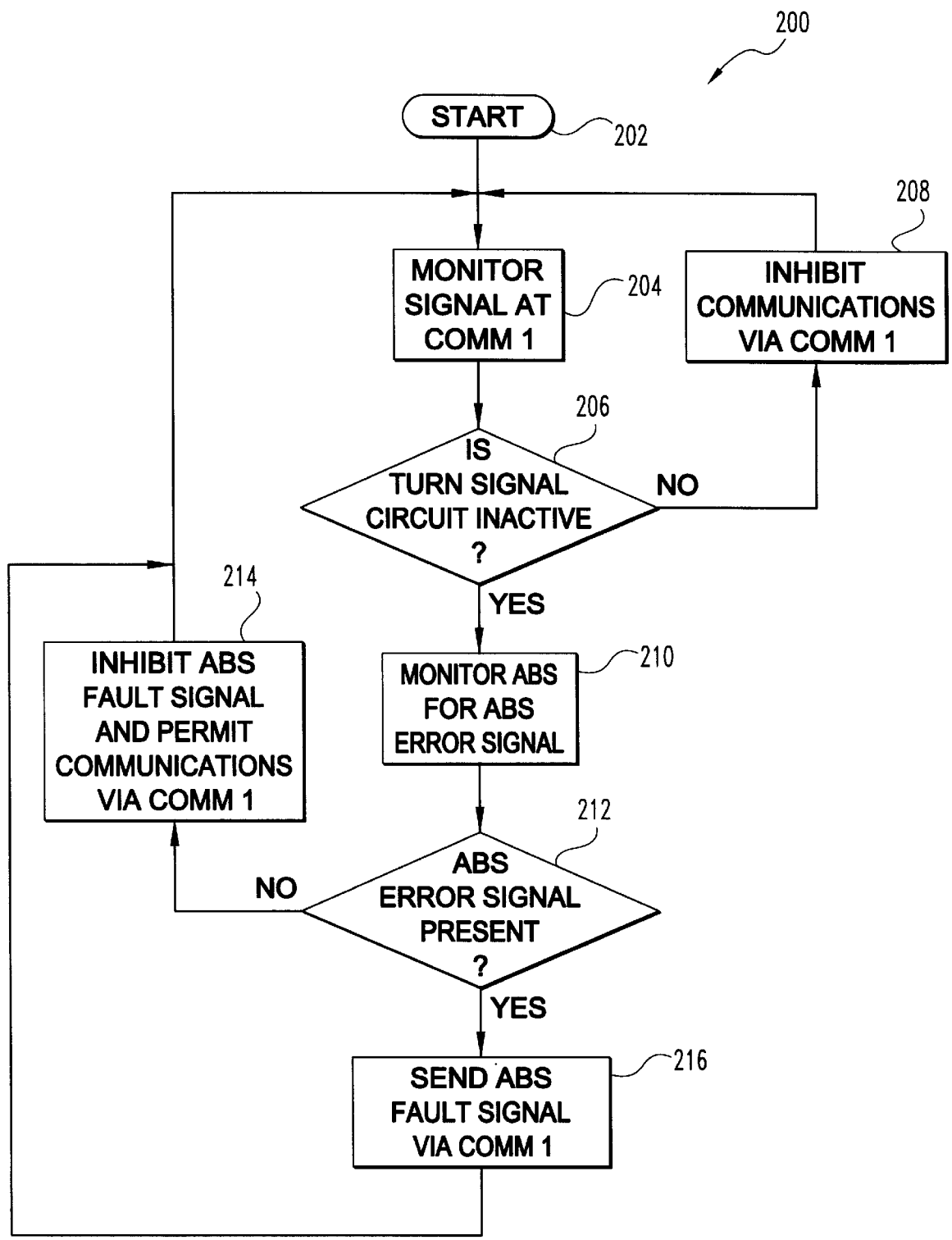
FIG. 6 is a flowchart illustrating one embodiment of a software algorithm, executable by the trailer communications module of FIG. 5, for monitoring a trailer ABS and transmitting periodic ABS fault signals upon detection of abnormal ABS operation.

Referring now to FIG. 6, one embodiment of a software algorithm 200, executable by the trailer communications device 122' for monitoring the ABS 124' and appropriately transmitting ABS fault information, is shown. Preferably, algorithm 200 is executed in a continuous loop many times per second. Algorithm 200 begins at step 202 and at step 204, trailer communications device 122' monitors the turn signal circuit path 68₂. Thereafter at step 206, trailer communications device determines whether the corresponding turn signal circuit is inactive according to any of the techniques described hereinabove. If, at step 206, trailer communications device 122' determines that the corresponding turn signal circuit is active, algorithm execution continues at step 208 where trailer communications device 122' inhibits communications via communications port COMM1 thereof. Algorithm execution continues from step 208 at step 204 where the turn signal circuit path 68₂ is again monitored.

If, at step 206, trailer communications device 122' determines that the corresponding turn signal circuit is inactive, algorithm execution continues at step 210 where trailer communications module monitors the signal on signal path 126. Thereafter at step 212, trailer communications device determines whether an ABS error signal, corresponding to a fault condition associated with ABS 124', exists on signal path 126. If not, algorithm execution continues at step 214 where trailer communications device 122' inhibits transmission of an ABS fault signal over turn signal circuit path 68₂, but permits any other data transmission thereon since the corresponding turn signal circuit is currently inactive. Algorithm execution continues from step 214 at step 204. If, at step 212, trailer communications device 122' determines that an ABS error signal is present on signal path 126, algorithm execution continues at step 216 where trailer communications device 122' transmits an ABS fault signal on turn signal circuit path 68₂ as described hereinabove.

Figure 7:
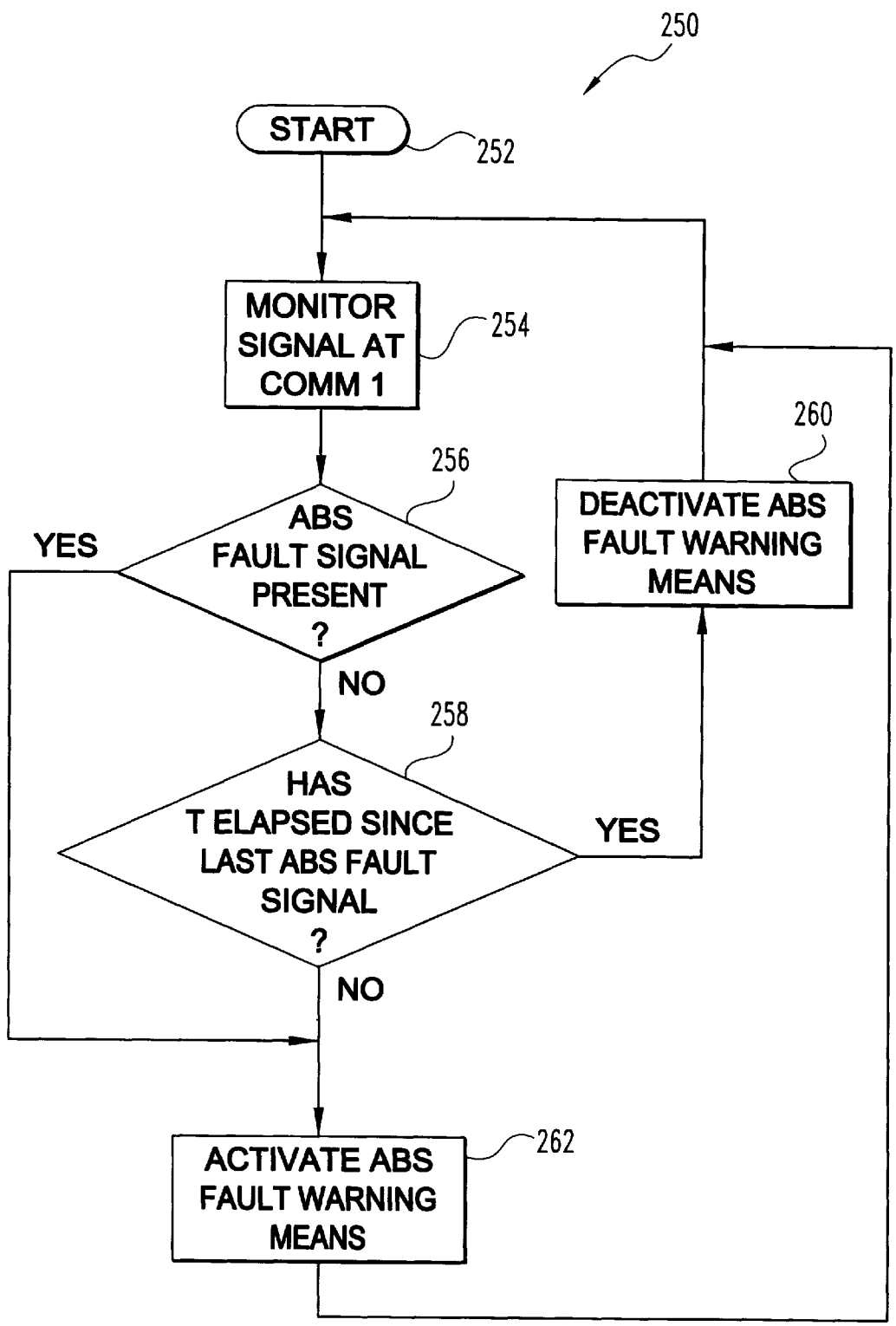
FIG. 7 is a flowchart illustrating one embodiment of a software algorithm, executable by the tractor communications module of FIG. 5, for monitoring the communications line and activating a tractor warning means for a predetermined time period upon detection of an ABS fault signal.

Referring now to FIG. 7, one embodiment of a software algorithm 250, executable by the tractor communications device 110' for monitoring the turn signal circuit path 58₂, which is connected to turn signal circuit path 68₂ of trailer 112, and activating warning device 130 upon detection of an ABS fault signal thereon, is shown. Preferably, algorithm 250 is executed in a continuous loop many times per second. Algorithm 250 begins at step 252 and at step 254, tractor communications device 110' monitors the turn signal circuit path 58₂ via communications port COMM1 thereof. Thereafter at step 256, tractor communications module 110' determines whether an ABS fault signal detectable thereon. If so, algorithm execution continues at step 258 where tractor communications device 110' determines whether a predetermined time period, T, has elapsed since detecting the previous ABS fault signal on turn signal circuit path 58₂. In one preferred embodiment, T=six seconds, although the present invention contemplates other time periods T. If, at step 258, tractor communications device 110' determines that a time period T has elapsed since the previous ABS fault signal, algorithm execution continues at step 260 where tractor communications device 110' deactivates the warning device 130. Algorithm execution continues from step 260 at step 254.

If, at step 256, tractor communications device 110' determines that an ABS fault signal is present on turn signal circuit path 58₂, algorithm execution continues at step 262 where tractor communications device 110' activates the warning device 130 by producing a warning signal on signal path 132.

Figure 8:
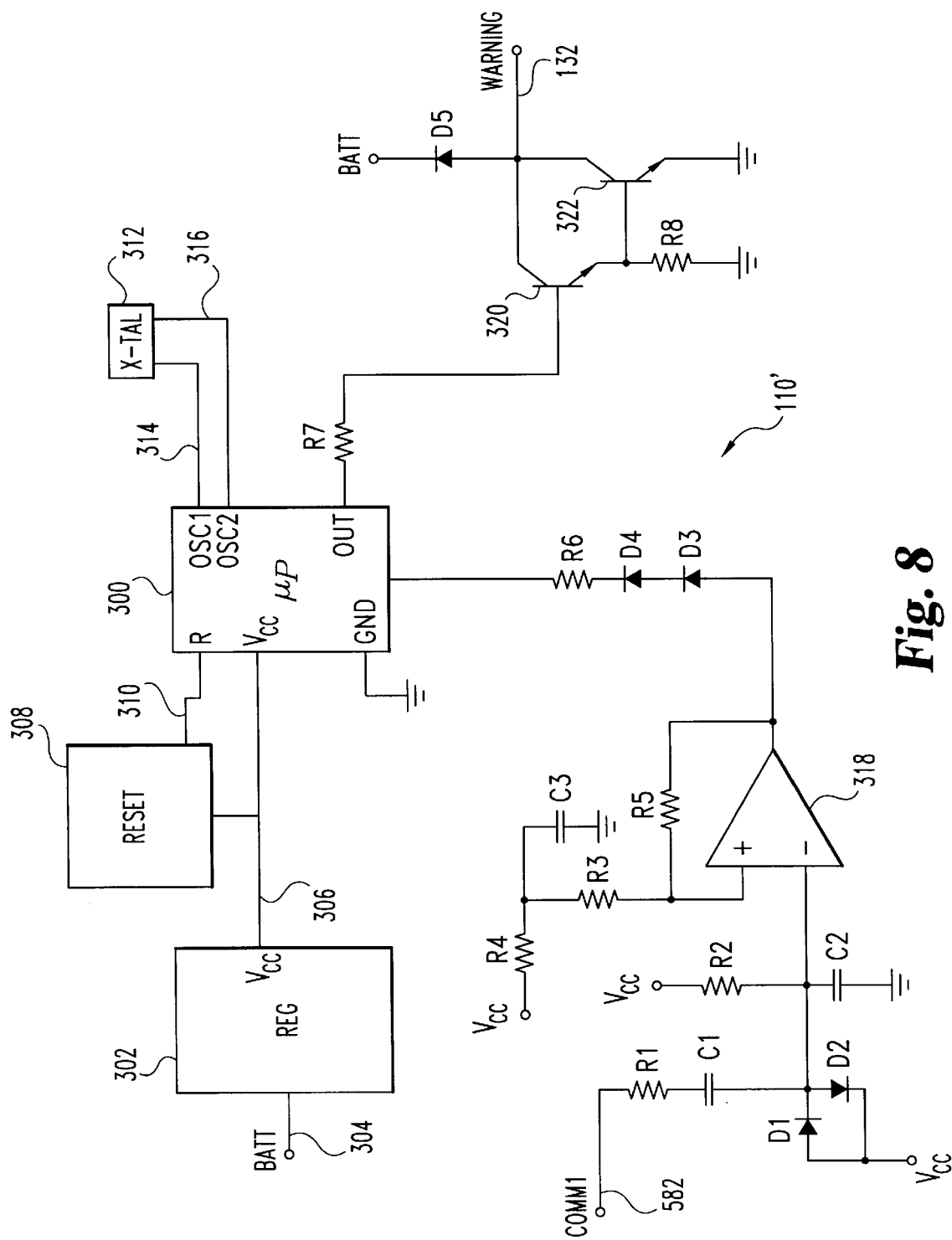
FIG. 8 is a schematic diagram of one embodiment of the tractor receiver module of FIG. 5, in accordance with yet another aspect of the present invention.

Referring now to FIG. 8, one preferred embodiment of the tractor receiver device 110' of FIG. 5, in accordance with yet another aspect of the present invention, is shown. Central to device 110' is a microprocessor-based controller 300. Controller 300 may be any known controller circuit operable to receive serial data and produce a warning signal in response thereto and in one embodiment is a Motorola 68HC705J1ACDW microcontroller. Controller 300 receives supply power, Vcc, from a known regulator circuit 302. Regulator circuit 302 receives battery voltage BATT from the vehicle battery or switched ignition circuit via signal path 304 and provides a regulated supply voltage Vcc of approximately 5 volts to controller 300 via signal path 306. A known reset circuit 308 is also included which receives Vcc from regulator circuit 302 and provides a reset signal to a reset input R of controller 300 via signal path 310. Reset circuit 308 is a low voltage reset circuit and provides a reset signal to reset controller 300 when the regulated voltage Vcc falls below a predefined voltage level. Preferably, reset circuit 308 is a Motorola MC34164 reset circuit, although the present invention contemplates utilizing any known reset circuit operable to provide a low voltage reset signal to controller 300.

Preferably, controller 300 receives a timing or clock signal from a known crystal-based circuit 312 connected to oscillator inputs OSC1 and OSC2 via signal paths 314 and 316 respectively. Although a crystal-based clock circuit 312 is illustrated as providing the timing or clock signal in FIG. 8, those skilled in the art will recognize that other known timing or clock circuits may be used to provide controller 300 with a timing or clock signal. In one embodiment, crystal-based circuit 312 is operable to provide a timing or clock signal of approximately 4 Mhz, although other timing or clock signal speeds are contemplated.

The COMM1 signal path 58$_2$ (see FIG. 5) is connected to one end of a first resistor R1 which has an opposite end connected to one end of a capacitor C1. The opposite end of the capacitor C1 is connected to a cathode of a first diode D1, an anode of a second diode D2, one end of a resistor R2, one end of a capacitor C2, and to an inverting input of a known amplifier circuit 318. The anode of diode D1, cathode of diode D2 and remaining end of resistor R2 are connected to regulated supply voltage Vcc, and the remaining end of capacitor C2 is connected to a ground reference. The non-inverting input of amplifier circuit 318 is connected to one end of a resistor R3 and to one end of another resistor R5, and the remaining end of R5 is connected to an output of amplifier circuit 318 to thereby form a feedback path around amplifier circuit 318. The remaining end of resistor R3 is connected to one end of another resistor R4 and to one end of a capacitor C3. The remaining end of resistor R4 is connected to Vcc and the remaining end of capacitor C3 is connected to ground reference.

The output of amplifier circuit 318 is connected to an anode of a diode D3, the cathode of which is connected to the anode of another diode D4. The cathode of diode D4 is connected to one end of a resistor R6, the opposite end of which is connected to a serial input port IN of controller 300.

An output OUT of controller 300 is connected to a driver circuit operable to provide a warning signal to the warning device 130 of FIG. 5. In one embodiment, the controller output OUT is connected to one end of a resistor R7, the opposite end of which is connected to the base of an NPN transistor 320 having a collector connected to signal path 132 (see FIG. 5) and an emitter connected to the base of a second NPN transistor 322 and to one end of a resistor R8. The remaining end of resistor R8 and the emitter of transistor 322 are connected to ground reference while the collector of transistor 322 is connected to signal path 132 and to the anode of a diode D5. The cathode of diode D5 is connected to battery voltage BATT.

Resistor R1 and capacitor C1 form a high pass filter circuit operable to filter out unwanted low frequency components from the signal present on turn signal circuit path 58$_2$. Diodes D1 and D2 act to clamp this signal to a voltage no higher than Vcc. Resistor R2 and capacitor C2 form an integrator circuit operable to filter out fast moving components from the signal present on turn signal circuit path 58$_2$. The high pass filter circuit comprised of R1 and C1 and the integrator circuit comprised of R2 and C2 together form a band pass filter operable to filter out unwanted noise and other signal components from the signal present on turn signal circuit path 58$_2$.

The amplifier circuit 318 and associated circuit components form an signal conditioning active filter circuit with hysteresis that is operable to square up the signal present on turn signal circuit path 58$_2$. The amplifier circuit 318 acts as an edge trigger circuit by comparing the change in the signal at the inverting input with the signal at the non-inverting input, so that the signal conditioning circuit formed by amplifier 318 and associated circuit components has a built in immunity to any ground offset that may be associated with the signal at the inverting input thereof. In one embodiment, the signal conditioning circuitry is operable to eliminate ground offsets as high as 1.5 volts that may exist between receiver circuit 110' and one or more of the transmitter circuits 122', which is a particular concern in multiple trailer configurations. The signal conditioned output signal of amplifier circuit 318 is passed through diodes D3 and D4 to provide a desired voltage drop thereof and to block signal components below ground potential. Resistor R6 limits the current provided to serial data input IN of controller 300.

When controller 300 recognizes an ABS fault signal present at COMM1, as described hereinabove, controller 300 is operable to produce a warning signal at output OUT thereof. The warning signal is received by the driver circuit comprising darlington connected transistors 320 and 322, and an appropriate drive signal is provided on signal path 132 to drive the warning device 130. Although not shown in FIG. 5, warning device 130 is, with the embodiment shown in FIG. 8, connected to battery voltage so that transistors 320 and 322 are responsive to the warning signal provided at controller output OUT to pull signal path 132 and thereby activate the warning device 130. Diode D5 is operable to clamp signal path 132 to no higher than battery voltage BATT. It bears pointing out that while a darlington configured driver circuit is illustrated in FIG. 8, those skilled in the art will recognize that other known warning device driving circuits may be used to receive the warning signal from controller 300 and drive the warning device in a suitable manner.

The following Table 1 lists preferred values of some of the circuit components of the circuitry of FIG. 8, although it is to be understood that Table 1 represents values for only one embodiment of the trailer transmitter device and other values and ranges of such circuit components are contemplated by the present invention.

TABLE 1

| COMPONENT | VALUE | |
|---|---|---|
| R1 | 249 | Ω |
| R2 | 10 | kΩ |
| R3 | 1.0 | kΩ |
| R4 | 10 | Ω |
| R5 | 604 | kΩ |
| R6 | 1.0 | kΩ |
| R7 | 1.0 | kΩ |
| R8 | 1.0 | kΩ |
| C1 | 0.1 | μF |
| C2 | 0.001 | μF |
| C3 | 0.1 | μF |

Figure 9:
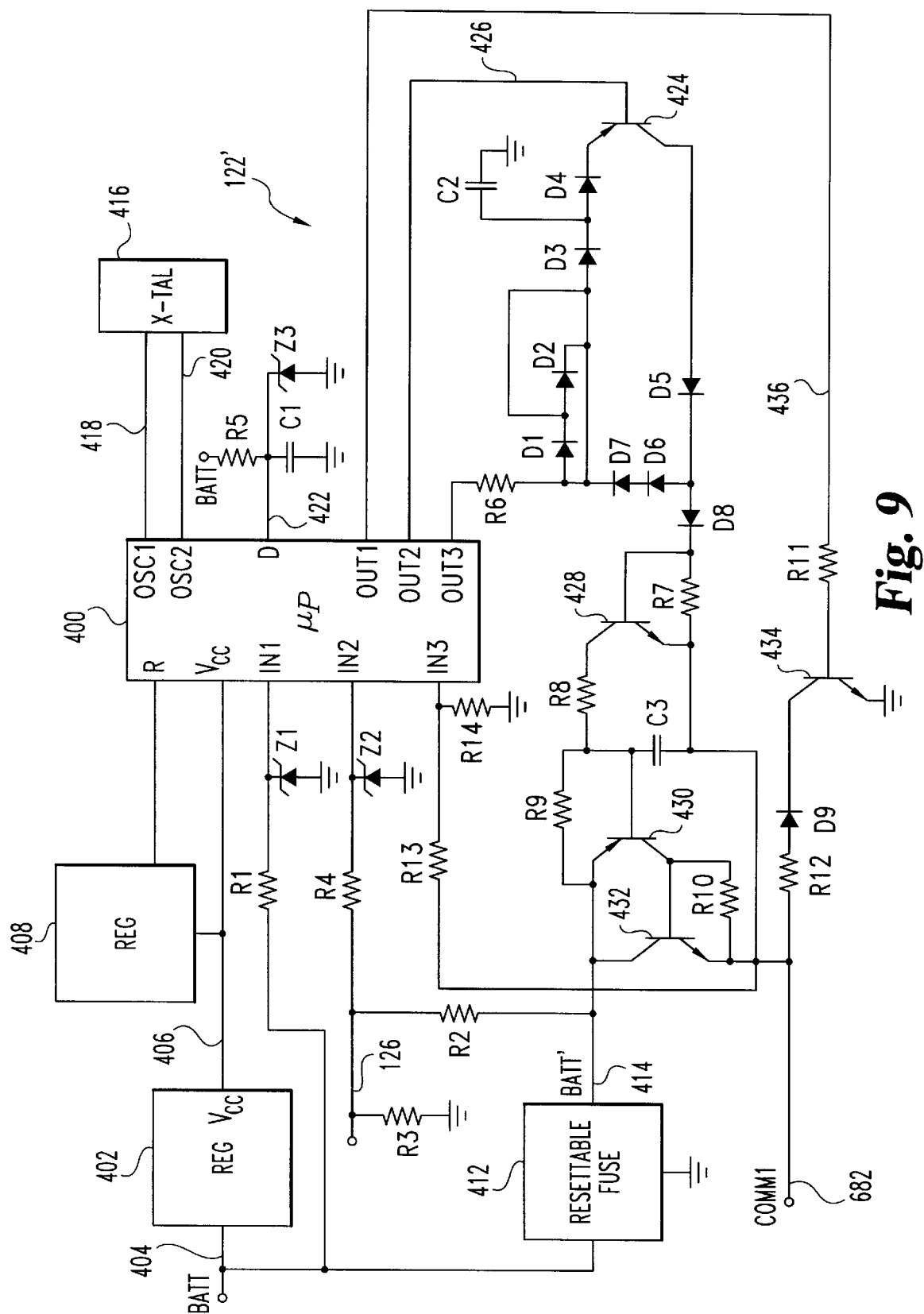
FIG. 9 is a schematic diagram of one embodiment of the trailer transmitter module of FIG. 5, in accordance with still another aspect of the present invention.

Referring now to FIG. 9, one preferred embodiment of the trailer transmitter device 122' of FIG. 5, in accordance with yet another aspect of the present invention, is shown. Central to device 122' is a microprocessor-based controller 400. Controller 400 may be any known controller circuit operable to transmit serial data in response to a fault or error signal, and in one embodiment is a Motorola 68HC705J1ACDW microcontroller. Controller 400 receives supply power, Vcc, from a known regulator circuit 402. Regulator circuit 402 receives battery voltage BATT from the vehicle battery or switched ignition circuit via signal path 404 and provides a regulated supply voltage Vcc of approximately 5 volts to controller 400 via signal path 406. Signal path 404 if also connected to one end of a resistor R1, the opposite end of which is connected to one end of a zener diode Z1 and an input IN1 of controller 400. The remaining end of Z1 is connected to ground reference. Controller 400 is operable to monitor input IN1 and determine that battery power is available to the trailer transmitter device 122' when a voltage level of at least a predetermined voltage level is present thereat. A known reset circuit 408 is also included which receives Vcc from regulator circuit 402 and provides a reset signal to a reset input R of controller 400 via signal path 410. Reset circuit 408 is a low voltage reset circuit and provides a reset signal to reset controller 400 when the regulated voltage Vcc falls below a predefined voltage level. Preferably, reset circuit 408 is a Motorola MC34164 reset circuit, although the present invention contemplates utilizing any known reset circuit operable to provide a low voltage reset signal to controller 400.

Preferably, controller 400 receives a timing or clock signal from a known crystal-based circuit 416 connected to oscillator inputs OSC1 and OSC2 via signal paths 418 and 420 respectively. Although a crystal-based clock circuit 416 is illustrated as providing the timing or clock signal in FIG. 8, those skilled in the art will recognize that other known timing or clock circuits may be used to provide controller 400 with a timing or clock signal. In one embodiment, crystal-based circuit 416 is operable to provide a timing or clock signal of approximately 4 Mhz, although other timing or clock signal speeds are contemplated.

Trailer transmitter device 122' also includes a resettable fuse circuit 412 which may be of known construction and is responsive to battery voltage BATT to provide clamped battery voltage BATT' on signal path 414. In one embodiment, resettable fuse circuit 412 is operable, in a known manner, to monitor battery voltage BATT and open a known resettable fuse and clamp BATT' at a predetermined voltage, preferably 18 volts, if BATT exceeds the predetermined voltage level.

Trailer transmitter device 122' also includes a random delay generator circuit which is preferably comprised of resistor R5, capacitor C1 and zener diode Z3 all connected to a delay input D of controller 400. The remaining end of R5 is connected to battery voltage BATT, while the remaining ends of C1 and Z3 are connected to ground reference. The delay generator circuit is operable to generate a unique random number to thereby render transmitter device 122'0 operable at a time that is unique to any other transmitter circuit that may be included in other trailers comprising a multiple trailer configuration. In this manner, the first transmitter circuit 122' of such a multiple trailer configuration that is rendered operable has first priority at transmitting data on the turn signal circuit path $68_2$. Any other trailer transmitter circuit having a communications port connected to turn signal circuit path $68_2$ must then wait until the turn signal circuit path $68_2$ is available before transmitting data thereon. This arrangement thus prevents multiple trailer transmitter circuits 122' from transmitting simultaneously in multiple trailer configurations.

Signal path 126 (see FIG. 5) is connected to one end of a resistor R3, one end of a resistor R2, and one end of a resistor R4. The remaining end of R3 is connected to ground reference, the remaining end of R2 is connected to signal path 414 and the remaining end of R4 is connected to input IN2 of controller 400 and to one end of a zener diode Z2. Signal path 126 may carry an ABS error signal, as described above, and input IN2 thus serves as an ABS error signal input to controller 400.

Communications port COMM1 is connected to one end of a resistor R13, the opposite end of which is connected to another input IN3 of controller 400 and to one end of a resistor R14. The remaining end of R14 is connected to ground reference. As described hereinabove, controller 400 is responsive to an ABS error signal detected at input IN2 to transmit a corresponding ABS fault signal on turn signal circuit path $68_2$ if turn signal circuit path $68_2$ is determined to be inactive. Controller 400 is operable to monitor input IN3 and determine that the turn signal circuit path $68_2$ is inactive if no turn signal or communication signal is detected thereat. Under such conditions, controller 400 is operable to produce a fault signal for communication on turn signal circuit path $68_2$ via controller outputs OUT1, OUT2 and OUT3 as will now be described in detail.

Controller output OUT1 is connected to one end of a resistor R11 via signal path 436, the opposite end of which is connected to the base of an NPN transistor 434. The emitter of transistor 434 is connected to ground potential and the collector is connected to the cathode of a blocking diode D9. The anode of D9 is connected to one end of a resistor R12, the opposite end of which is connected to turn signal circuit path $68_2$.

Controller output OUT2 is connected to the base of a PNP transistor 424 via signal path 426. The emitter of transistor 424 is connected to the cathode of a diode D4, the anode of which is connected to the cathode of another diode D3 and to a capacitor C2. The remaining end of capacitor C2 is connected to ground potential. The anode of D3 is connected to the cathode of another diode D2, the cathode of another diode D1, the cathode of another diode D7 and to one end of a resistor R6. The anode of D2 is connected to the cathode of D1, and the anode of D1 is connected to the cathode of D7. The remaining end of R6 is connected to controller output OUT3. The anode of D7 is connected to the cathode of another diode D6, the anode of which is connected to the cathode of another diode D5 and to the anode of yet another diode D8. The anode of D5 is connected to the collector of transistor 424.

The cathode of D8 is connected to one end of a resistor R7 and to the base of an NPN transistor 428. The emitter of transistor 428 is connected to the remaining end of R7, to one end of a capacitor C3 and to turn signal circuit path $68_2$. The collector of transistor 428 is connected to one end of a resistor R8, the opposite end of which is connected to one end of another resistor R9, to the base of PNP transistor 430 and to the remaining end of capacitor C3. The emitter of transistor 430 is connected to the remaining end of resistor R9, to the collector of an NPN transistor 432 and to BATT' signal line 414. The collector of transistor 430 is connected to the base of transistor 432 and to one end of a resistor R10. The opposite end of R10 is connected to the emitter of transistor 432 and to turn signal circuit path $68_2$.

When controller 400 detects an ABS error signal at input IN2 and has determined, by monitoring input IN3, that the turn signal circuit $68_2$ is inactive, controller 400 transmits an ABS fault signal, as described hereinabove, at outputs OUT1, OUT2 and OUT3. When transmitting a high data signal, controller 400 produces a low signal at OUT1, thereby maintaining transistor 434 in an "off" state, a low signal at output OUT2, thereby turning on transistor 424, and transmits a high signal at output OUT3. Diodes D1–D8 convert the high level signal produces at output OUT3 to a desired voltage level which, in one embodiment, is approximately 2.2 volts. Transistors 428, 430 and 432, and associated circuit components, provide high current drive, which in one embodiment may be up to 25 amps, to the high level data signal and provide the approximately 2.2 volt high current signal on turn signal circuit path $68_2$ for transmission to the tractor receiver device 110'. The communication signal voltage level of approximately 2.2 volts, along with the 9,600 baud transmission rate discussed hereinabove, is chosen so that data transmission on turn signal circuit path $68_2$ lacks sufficient power to activate the turn signal circuit connected to turn signal circuit path $68_2$. Advantageously, communications between trailer transmitter device 122' and tractor receiver circuit 110' will therefore not activate either of the tractor or trailer turn signal circuits, and will consequently not cause illumination of the associated turn signal lamps, even if such lamps LED-based.

When transmitting a low level data signal, controller 400 produces a high signal at output OUT1 to thereby turn on transistor 434 and thereby pull turn signal circuit path $68_2$ to ground potential. At the same time, controller circuit 400 produces a high level signal at output OUT2 to thereby turn off transistor 424 and a low level signal at output OUT3. Controller 400 produces a stream of serial data on turn signal circuit path $68_2$ by correspondingly toggling outputs OUT1, OUT2 and OUT3 at a high rate of speed to thereby form the desired serial data pattern. The push-pull arrangement of the above-described data transmission circuitry facilitates such high speed operation by providing for hard signal switching to thereby eliminate any concern over slow signal decay due to any capacitance inherent in, or added to, the transmission circuitry.

The following Table 2 lists preferred values of some of the circuit components of the circuitry of FIG. 9, although it is to be understood that Table 2 represents values for only one embodiment of the trailer transmitter device and other values and ranges of such circuit components are contemplated by the present invention.

TABLE 2

| COMPONENT | VALUE | |
|---|---|---|
| R1 | 10 | kΩ |
| R2 | 4.99 | kΩ |
| R3 | 2.7 | Ω |
| R4 | 10 | kΩ |
| R5 | 10 | kΩ |
| R6 | 22.1 | Ω |
| R7 | 4.99 | kΩ |
| R8 | 100 | Ω |
| R9 | 1.0 | kΩ |
| R10 | 100 | Ω |
| R11 | 1.0 | kΩ |
| R12 | 2.7 | Ω |
| Z1 | 5.1 | volts |
| Z2 | 5.1 | volts |
| Z3 | 5.1 | volts |
| C1 | 0.1 | µF |
| C2 | 0.001 | µF |
| C3 | 0.001 | µF |

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. For example, while the foregoing invention has been described as establishing communications between a tractor communications device 110 and a trailer communications device 122, it is to be understood that the tractor communications device 110 may in fact be located in a trailer of a multiple trailer arrangement. The trailer communications device 122 in such a setup then corresponds to a communications device located in another trailer of the multiple trailer arrangement. Such an interpretation of the meanings of the terms "tractor" and "trailer" is consistent with the definition of these terms set forth in the BACKGROUND section.

What is claimed is:

1. A tractor communication system for providing warning of a fault condition associated with an electrical system external to the tractor, comprising:

an electrical connector mounted to a tractor and having a number of electrical terminals adapted for connection to an electrical system external to the tractor;

a tractor electrical system including a turn signal circuit having a turn signal circuit path connected to one of said electrical terminals of said electrical connector;

means disposed in a cab of said truck and responsive to a warning signal for providing a warning indicative of a fault condition associated with the electrical system external to said tractor; and a communications device having a communications port connected to said turn signal circuit path, said communications port adapted to receive a fault signal indicative of said fault condition as long as said turn signal circuit is inactive, said communications device providing said warning signal in response to detection of said fault signal at said communications port.

2. The tractor communication system of claim 1 wherein said communications device is operable to provide said warning signal for at least a predetermined time period following detection at said communications port of a transition of said fault signal from an active state to an inactive state thereof.

3. The tractor communication system of claim 2 wherein said fault signal is a periodic signal as long as said turn signal circuit is inactive.

4. The tractor communication system of claim 1 wherein said electrical connector is an SAE J-560 electrical connector.

5. The tractor communication system of claim 1 wherein said electrical system external to the tractor includes an anti-lock brake system (ABS) of a trailer attached to said tractor.

6. The tractor communication system of claim 1 further including means for periodically activating said turn signal circuit.

7. The tractor communication system of claim 1 wherein tractor electrical system further includes a source of electrical power connected to another one of said electrical terminals of said electrical connector for providing electrical power to said electrical system external to the tractor.

8. The tractor communication system of claim 1 wherein said means disposed in a cab of said truck and responsive to a warning signal for providing a warning indicative of a fault condition associated with the electrical system external to said tractor includes means disposed within a cab area of the tractor for providing a visual warning of said fault condition.

9. A trailer communication system for providing a fault signal to a system external to the trailer, comprising:

an electrical connector mounted to a trailer and having a number of electrical terminals adapted for connection to an electrical system external to the trailer;

a trailer electrical system including a turn signal circuit having a turn signal circuit path connected to one of said electrical terminals of said electrical connector;

a special purpose trailer electrical system producing an error signal in response to an abnormal operating condition thereof; and a communications device having a communications port connected to said turn signal circuit path, said communications device responsive to detection of said error signal to transmit a corresponding fault signal at said communications port if said turn signal circuit is inactive.

10. The trailer communication system of claim 9 further including a turn signaling device connected to said turn signal path, said turn signaling device responsive to an active state of said turn signal circuit to produce a turn signal.

11. The trailer communication system of claim 9 wherein said electrical connector is an SAE J-560 electrical connector.

12. The trailer communication system of claim 9 wherein said communications device is operable to periodically transmit said fault signal at said communications port as long as said error signal is present and said turn signal circuit is inactive.

13. The trailer communication system of claim 9 wherein said special purpose trailer electrical system is an anti-lock brake system.

14. The trailer communication system of claim 9 wherein said fault signal is a low power signal incapable of activating said turn signal circuit.

15. A tractor/trailer communications system for providing a warning in a tractor of a fault condition associated with a special purpose electrical system in a trailer, comprising:

a tractor communications device associated with a tractor and having a first communications port connected to a turn signal circuit path of said tractor;

a trailer communications device associated with the trailer and having a second communications port connected to a corresponding turn signal circuit path of said trailer;

a special purpose electrical system associated with the trailer and producing an error signal in response to an abnormal operating condition thereof;

means responsive to a warning signal for providing a warning in the tractor of a fault condition associated with said special purpose electrical system;

an electrical connection device extending between the tractor and trailer and connecting said turn signal circuit paths thereof to thereby complete a turn signal circuit, said trailer communications device responsive to detection of said error signal at said second communications port to transmit a corresponding fault signal on said turn signal circuit if said turn signal circuit is inactive, said tractor communications device responsive to detection of said fault signal at said first communications port to provide said warning signal.

16. The tractor/trailer communications system of claim 15 wherein said tractor communications device is operable to provide said warning signal for at least a predetermined time period following detection of a transition of said fault signal at said first communications port from an active state to an inactive state thereof.

17. The tractor/trailer communication system of claim 15 wherein said trailer communications device is operable to periodically transmit said fault signal at said second communications port as long as said error signal is present and said turn signal circuit is inactive.

18. The tractor/trailer communication system of claim 15 wherein said special purpose trailer electrical system is an anti-lock brake system.

19. The tractor/trailer communications system of claim 15 wherein said electrical connection device is an SAE J-1067 electrical connection cable.

20. The tractor and trailer communications link of claim 19 further including a first electrical connector mounted to the tractor and defining a number of electrical terminals therein;

and wherein said turn signal circuit path of said tractor is connected to one of said electrical terminals of said first electrical connector.

21. The tractor and trailer communications link of claim 20 further including a second electrical connector mounted to the trailer and defining a number of electrical terminals therein;

and wherein said turn signal circuit path of said trailer is connected to one of said electrical terminals of said second electrical connector.

22. The tractor and trailer communications link of claim 21 wherein each of said first and second electrical connectors are SAE J-560 electrical connectors.

23. The trailer communication system of claim 15 wherein said fault signal is a low power signal incapable of activating said turn signal circuit.

* * * * *

UNITED STATES PATENT AND TRADEMARK OFFICE
CERTIFICATE OF CORRECTION

PATENT NO : 5,920,128
DATED     : July 6, 1999
INVENTOR(S) : Antonio Hines

It is certified that error appears in the above-identified patent and that said Letters Patent is hereby corrected as shown below:

In column 17, line 36, please change "122'0" to --122'--.

Signed and Sealed this

Fourth Day of July, 2000

Attest:

Q. TODD DICKINSON

Attesting Officer

Director of Patents and Trademarks